United States Patent
Menke et al.

[11] Patent Number: 6,038,895
[45] Date of Patent: Mar. 21, 2000

[54] ELECTRICAL SELF-POWERED MOTOR-VEHICLE DOOR LATCH

[75] Inventors: Johannes-Theodor Menke, Velbert; Klaus-Peter Reis, Deternerlehe, both of Germany

[73] Assignee: Kiekert AG, Heiligenhaus, Germany

[21] Appl. No.: 09/071,406

[22] Filed: May 1, 1998

[30] Foreign Application Priority Data

Jun. 7, 1997 [DE] Germany .......................... 197 24 085

[51] Int. Cl.[7] .................................................. E05B 49/00
[52] U.S. Cl. ........................ 70/278.1; 70/278.3; 70/223; 70/224
[58] Field of Search .............................. 70/278, 277, 218, 70/221, 222, 223, 224, 237, 254, 255, 278.1, 278.3

[56] References Cited

U.S. PATENT DOCUMENTS

| | | | |
|---|---|---|---|
| 3,733,861 | 5/1973 | Lester | 70/153 |
| 4,771,620 | 9/1988 | Kleinhany | 70/277 |
| 4,856,310 | 8/1989 | Parienti | 70/379 R |
| 5,265,452 | 11/1993 | Dawson et al. | 70/278 |
| 5,497,641 | 3/1996 | Linde et al. | 70/257 |
| 5,553,472 | 9/1996 | Jasper | 70/278 |
| 5,722,274 | 3/1998 | Nakauchi et al. | 70/276 |
| 5,734,445 | 3/1998 | Neill | 348/734 |
| 5,768,926 | 6/1998 | Shen | 70/472 |
| 5,791,703 | 8/1998 | Kritzler et al. | 292/336.3 |

FOREIGN PATENT DOCUMENTS 40 23 386 C2  1/1992  Germany.

Primary Examiner—B. Dayoan
Assistant Examiner—Clifford B Vaterlaus
Attorney, Agent, or Firm—Herbert Dubno; Andrew Wilford

[57] ABSTRACT

A motor-vehicle latch system has a latch having a locking element displaceable between a locked position and an unlocked position and a latching element actuatable in the unlocked condition of the latch to unlock the latch and ineffective when actuated in the locked condition of the latch. An outside door handle connected to the latching element is movable between an actuated position and an unactuated position and a key having a transponder can fit in a rotatable body carrying an electrically powered transponder reader that can read a code of the transponder of the key. An electrically powered electromagnetic coupling has one part connected to the body and another part connected to the locking lever and can be energized to close and couple the two parts together and thereby connect the body with the locking lever. An electrically powered controller connected to the transponder reader and the coupling can energize and close the coupling when the transponder in the key matches a predetermined code. A dynamo adjacent the door handle is connected to the coupling and to the controller. An energy-storage unit connected to the dynamo receives electricity therefrom and supplies it to the reader, coupling, and controller. The dynamo is coupled to the door handle for operation of the dynamo and charging of the storage unit on displacement of the handle between the actuated and unactuated positions.

5 Claims, 2 Drawing Sheets

6,038,895

ELECTRICAL SELF-POWERED MOTOR-VEHICLE DOOR LATCH

FIELD OF THE INVENTION

The present invention relates to a motor-vehicle door latch. More particularly this invention concerns such a door latch with an electrically coded key.

BACKGROUND OF THE INVENTION

A standard motor-vehicle door latch can be switched between a locked and unlocked position by operation of a standard lock cylinder by a mechanically and even magnetically bitted key. When the appropriately bitted key is inserted into the cylinder, it can be turned to move a locking lever of the latch between the locked and unlocked positions. In the locked position at least the outside door handle is either blocked or is uncoupled from a latching lever of the latch mechanism so that its actuation will not open the door. This system is standard and can be overcome in many ways, as for instance by picking or forcing the lock.

Accordingly more sophisticated systems have been proposed where the key has electrical coding, often constituted as a transponder right in the key that can be read by an appropriate device in the latch. The transponder reader will only issue a command to the latch allowing it to be moved between the locked and unlocked positions when a key having the appropriately coded transponder is inserted into the key passage. Such a system can be made very secure, as the number of codes is vast. It has, however, the major disadvantage that, if the vehicle's battery goes dead, the latch becomes nonoperational so some sort of mechanical backup that constitutes a security problem must be provided.

Accordingly German patent 4,023,386 of Hiebl describes a combined electrical/mechanical system where an electrical/mechanical key is used. When the electrical coding is correct, the latch establishes a mechanical connection so that the latch then functions as a mechanical key. The system monitors battery power and, if it detects a decline in voltage that indicates an impending power failure, it establishes the necessary mechanical coupling so that, even if the power fails completely, the latch can still be operated mechanically. Such a system offers certain advantages, but fails to function if power is cut suddenly. Furthermore the mechanical backup represents a weak aspect of the lock from the security point of view.

OBJECTS OF THE INVENTION

It is therefore an object of the present invention to provide an improved motor-vehicle door latch using an electrically coded key.

Another object is the provision of such an improved motor-vehicle door latch using an electrically coded key which overcomes the above-given disadvantages, that is which can operate even if the vehicle's on-board power supply, that is its battery, fails.

SUMMARY OF THE INVENTION

A motor-vehicle latch system has a latch having a locking element displaceable between a locked position corresponding to a locked condition of the latch and an unlocked position corresponding to an unlocked condition of the latch and a latching element actuatable in the unlocked condition of the latch to unlock the latch and ineffective when actuated in the locked condition of the latch. An outside door handle connected to the latching element is movable between an actuated position and an unactuated position and a key having a transponder can fit to in a rotatable body. An electrically powered transponder reader on the body can read a code of the transponder of the key. An electrically powered electromagnetic coupling has one part connected to the body and another part connected to the locking lever and can be energized to close and couple the two parts together and thereby connect the body with the locking lever. An electrically powered controller connected to the transponder reader and the coupling can energize and close the coupling when the transponder in the key matches a predetermined code. A dynamo adjacent the door handle is connected to the coupling and to the controller. An energy-storage unit connected to the dynamo receives electricity therefrom and supplies it to the reader, coupling, and controller. The dynamo is coupled to the door handle for operation of the dynamo and charging of the storage unit on displacement of the handle between the actuated and unactuated positions.

Thus with this system if the vehicle's on-board power supply, typically its battery, fails, the door handle can be operated to generate enough electricity to operate the door latch. It therefore is not necessary to provide a mechanical backup system. The dynamo and power-storage unit are far easier and cheaper to build into the latch than the standard mechanical backup system and do not present a security problem. Thus the high security achieved by a transponder-type key is maintained, and the system can be counted on to function even if the vehicle has completely lost power.

The controller according to the invention is connected between the transponder reader and the coupling. In addition the handle is provided with an elongated gear rack and the dynamo is provided with a rotary input gear meshing with the rack. The end of the rack is connected to the latching element of the latch. Furthermore the handle pivots about an axis and the rack is curved and centered on the axis.

The coupling is provided with a biasing unit, normally a spring that pulls the coupling parts apart when the coupling is electrically deenergized. In addition according to the invention the coupling includes an electromagnet electrically energizable to interconnect the coupling parts.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
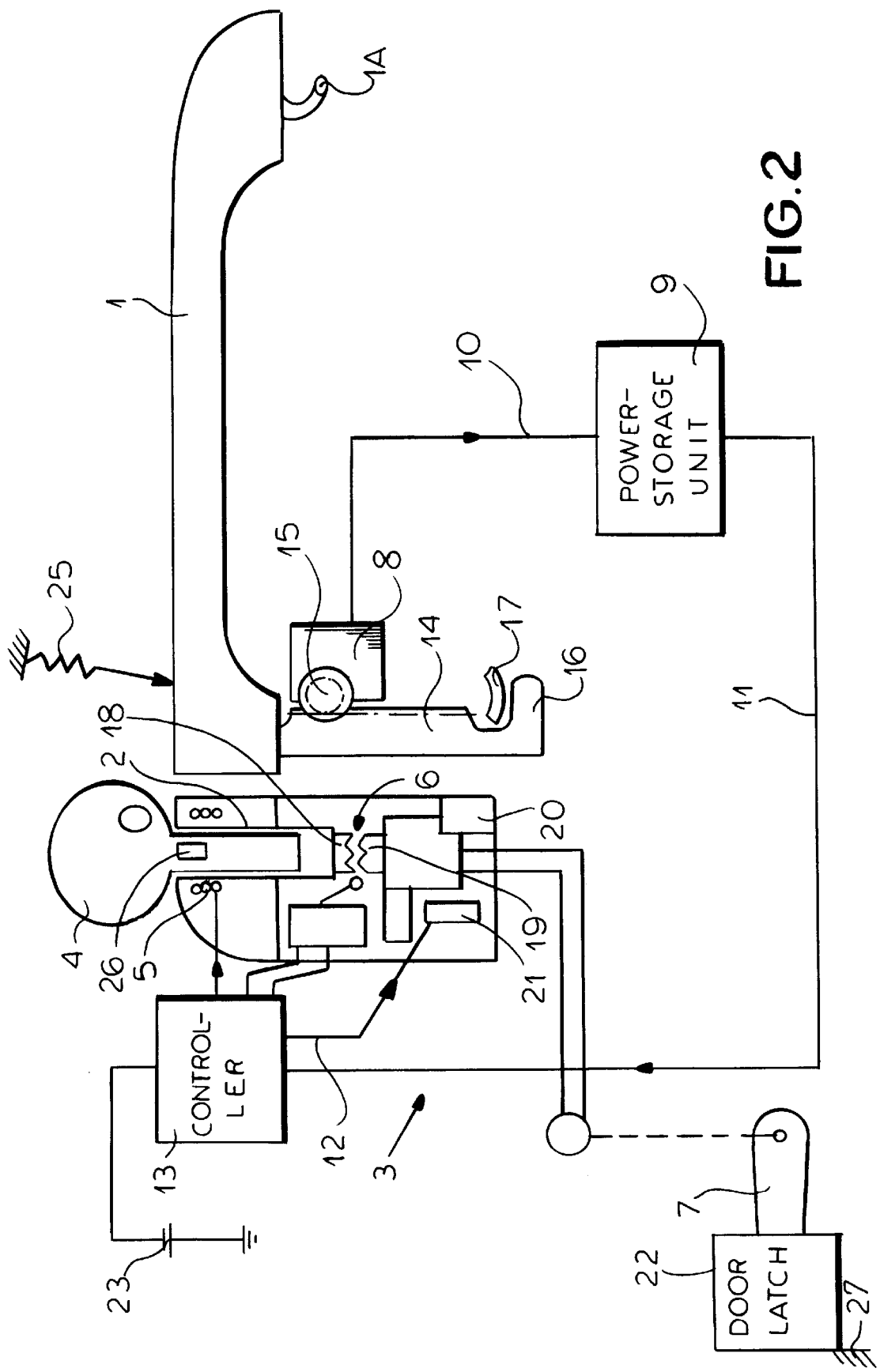
FIG. 2 is a partly schematic view of the latch.

As seen in FIG. 2 a motor-vehicle door latch 22 is normally mounted on a door edge shown schematically at 27 and has an unillustrated fork that can be locked around a bolt fixed to a door post to hold closed the door 27 in which the latch 22 is mounted. This latch 22 has a locking lever 7 and an outside actuating lever 17. A door handle 1 can pivot about an axis 1A on the door 27 and has remote from this axis 1A an arm 14 whose inner end is hooked around the actuating lever 17 so that when pulled out against the force of a spring 25 the handle 1 moves this lever 17. The lever 7 can set the latch 22 in an unlocked condition in which the lever 17 is coupled to the latch mechanism so that actuation of the handle 1 is effective to operate the latch 22 and open the door 27, or in a locked position in which the lever 17 can move but is not coupled to the latch mechanism, making it impossible to open the door 27 from outside by means of the handle 1. This is all substantially standard.

Figure 1:
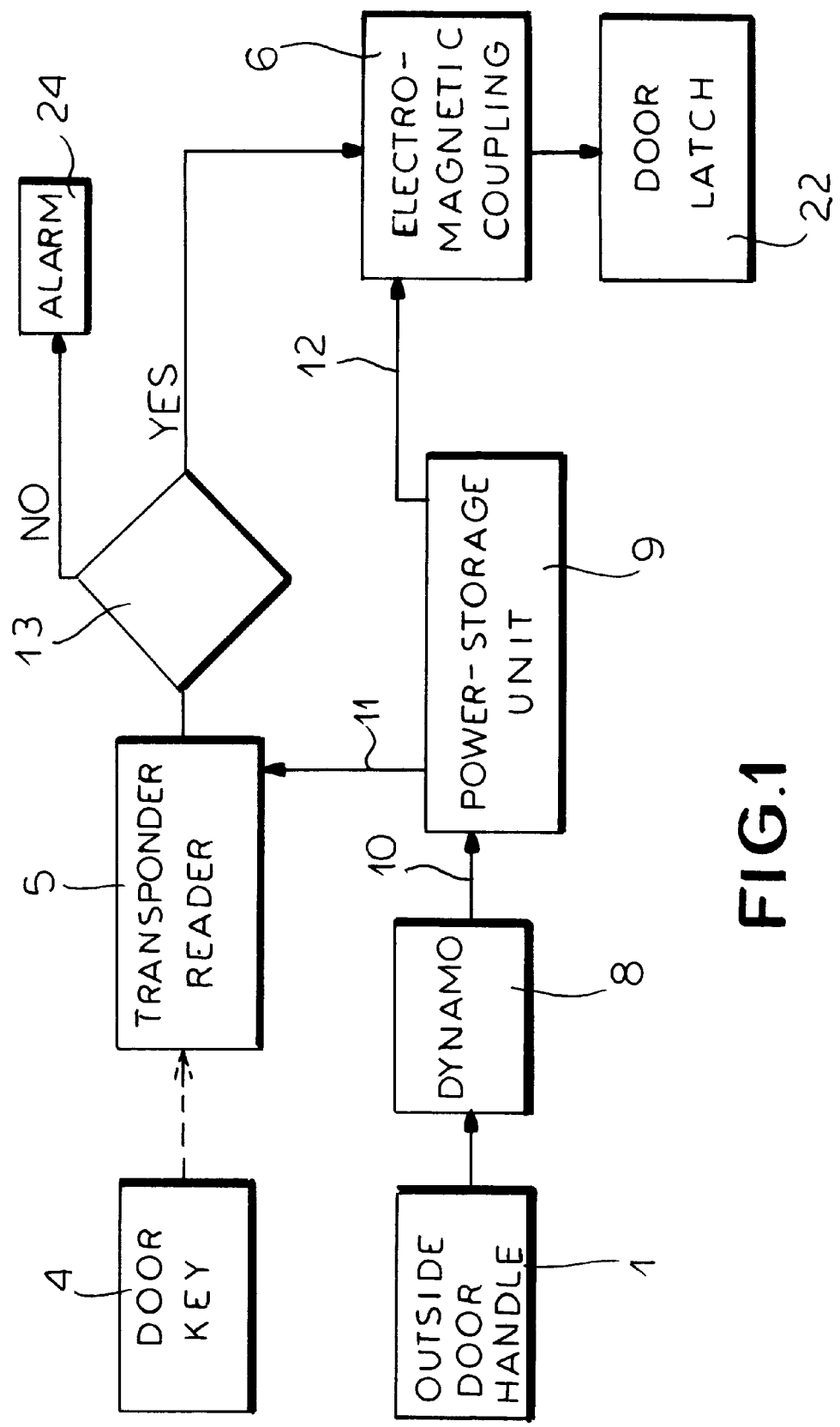
FIG. 1 is a schematic diagram illustrating the system of this invention.

More particularly the latch system includes a rotatable key barrel 2 adapted to receive a key 4 and holding a reader coil 5 that can interact with a transponder 26 built into the key 4. A controller 13 connected to the reader 5 determines if the transponder 26 of the key 4 matches the appropriate code and if not activates an alarm 24 (FIG. 1). The barrel 2 can be connected via an electromagnetic coupling 6 to a linkage 3 that is connected to the locking lever 7. This coupling 6 includes a part 18 fixed on the barrel 2 and another part 19 that is normally pulled back out of contact with the part 18 by an actuator 20 and that can be moved by a solenoid 21 into engagement with the part 18 to couple the parts 18 and 19 together and, therefore, connect the barrel 2 via the linkage 3 with the locking lever 7. When the clutch 6 is energized and closed it allows the key 4 to switch the latch 22 between the locked and unlocked conditions. When the clutch 6 is deenergized it breaks this connection and the key 4 and barrel 2 can be turned without locking or unlocking the latch 22.

According to the invention the arm 16 of the handle 1 is formed as a slightly arcuate rack 14 meshing with an input gear 15 of a small dynamo 8 built right into the vehicle door 27 with the latch 22. As shown in FIG. 1 when the wheel 15 of this dynamo 8 is spun, the dynamo 8 feeds electrical energy via a line 10 to a power-storage unit 9, which can be for instance a so-called instant-charge battery or a capacitative power-storage unit, which in turn is connected via a line 11 to the transponder reader 5 to power it and via a line 12 to the coupling 6 to provide power to it.

Under normal circumstances a standard on-board vehicle battery 23 powers the controller 13 and clutch 6, but when this battery 23 is dead, the user can quickly actuate the handle 1 several times in succession to generate enough voltage to charge the unit 9 and provide sufficient operating current to the reader 5 and coupling 6. Thus the latch will be electrically operable at all times and no backup mechanical system need be provided.

We claim:

1. A motor-vehicle latch system comprising:

a latch having a locking lever displaceable between a locked position corresponding to a locked condition of the latch and an unlocked position corresponding to an unlocked condition of the latch and a latching element actuatable in the unlocked condition of the latch to unlock the latch and ineffective when actuated in the locked condition of the latch;

an outside door handle connected to the latching element and pivotal between an actuated position and an unactuated position;

a key having a transponder;

a body in which the key is receivable and which is rotatable by the key;

an electrically powered transponder reader on the body capable of reading a code of the transponder of the key;

an electrically powered normally open electromagnetic coupling having one part connected to the body and another part and energizable to close and couple the two parts together, whereby absent energization the coupling is open and the parts are not connected together;

a mechanical linkage connected between the other part of the coupling and the locking lever;

electrically powered control means connected to the transponder reader and the coupling for energizing and connecting together the parts of the coupling when the transponder in the key matches a predetermined code;

a dynamo fixed on the door adjacent the door handles, having a rotary input gear and connected to the coupling and control means;

an energy-storage unit connected to the dynamo to receive electricity therefrom and to the reader, coupling, and control means to supply electricity thereto; and means including an elongated rack mounted on the handle and meshing with the input gear for operating the dynamo and charging the storage unit on displacement of the handle between the actuated and unactuated positions.

2. The latch system defined in claim 1 wherein the control means is connected between the transponder reader and the coupling.

3. The latch system defined in claim 1 wherein the end of the rack is connected to the latching element of the latch.

4. The latch system defined in claim 1 wherein the handle pivots about an axis and the rack is curved and centered on the axis.

5. The latch system defined in claim 1 wherein the coupling includes an electromagnet electrically energizable to interconnect the coupling parts.

* * * * *